United States Patent [19]

Hudson

[11] Patent Number: 4,869,834
[45] Date of Patent: Sep. 26, 1989

[54] METHOD AND APPARATUS FOR CONTROLLING RUN OF A MOVING WEB IN A PREDETERMINED PATH, ESPECIALLY A FILTER MATERIAL WEB, THROUGH A PLATE FILTER

[75] Inventor: John H. Hudson, Monaco, Monaco

[73] Assignee: Tenag AG, Glattbrugg, Switzerland

[21] Appl. No.: 226,942

[22] Filed: Aug. 1, 1988

[30] Foreign Application Priority Data

Aug. 5, 1987 [CH] Switzerland .................... 3005/87

[51] Int. Cl.⁴ .................. B01D 25/00; B01D 25/12; B01D 25/32
[52] U.S. Cl. .................................. 210/791; 210/143; 210/225; 210/227; 210/387; 210/396; 210/DIG. 3; 100/196
[58] Field of Search ............. 210/224, 225, 227, 387, 210/396, 392, 770, DIG. 3, 143, 767, 791; 198/839, 841; 100/113, 112, 118, 151, 194, 196; 15/256.5; 162/272, 274; 226/196, 197

[56] References Cited

U.S. PATENT DOCUMENTS

| | | | |
|---|---|---|---|
| 1,610,671 | 2/1925 | Funk | 226/197 |
| 2,760,773 | 8/1956 | Brodie | 226/197 |
| 3,608,734 | 9/1971 | Schneider | 210/387 |
| 3,608,743 | 9/1971 | Schneider | 210/387 |
| 3,809,303 | 5/1974 | Brunner | 226/197 |
| 4,274,961 | 6/1981 | Hirs | 210/225 |

FOREIGN PATENT DOCUMENTS

0032829 7/1981 European Pat. Off. .
2020565 11/1979 United Kingdom .
2143793 2/1985 United Kingdom .

Primary Examiner—W. Gary Jones
Assistant Examiner—Matthew Savage
Attorney, Agent, or Firm—Frishauf, Holtz, Goodman & Woodward

[57] ABSTRACT

To ensure that a web (11) of filter material is properly passed between filter plates (25) of a filter stack (23), without skewing, which might cause leakage along the edges of the filter plates, the web is guided to the filter plates by guide rollers and, after being received from the stack of plates, passed over an inclined deflection edge (13) on a deflection element or rod, located at an angle of 45° with respect to the edge of the essentially rectangular plates, so that the run-on and run-off surfaces of the web will form a web deflection angle ($\alpha$) of about 90°, and a web plane diversion angle ($\beta$) of 0°. A plurality of deflection rod groups may be used, guiding webs alternately, for example, to the right or left after having passed through a stack, or permitting passage of the webs through an additional stack (FIG. 13) since, upon passage about the deflection rods, the orientation of the surfaces of the filter web is reversed. The webs are pulled from between the filter plates after separation of the filter plates by a transport mechanism, located downstream of a last group of deflection rods. Preferably, a cleaning apparatus (41), such as a tensioned wire, is located at or adjacent the deflection element to remove filtrate and filter cake and the like from the filter web before the latter is rewound or collected for disposal.

29 Claims, 5 Drawing Sheets

METHOD AND APPARATUS FOR CONTROLLING RUN OF A MOVING WEB IN A PREDETERMINED PATH, ESPECIALLY A FILTER MATERIAL WEB, THROUGH A PLATE FILTER

Reference to related patents, the disclosures of which are hereby incorporated by reference:
U.S. Pat. No. 3,608,734, Schneider.
Reference to related publication:
Published European Patent Application 0 032 829, Schneider.

The present invention relates to a method and apparatus for automatically retaining a moving web in a predetermined movement path, and more particularly to maintaining the path of movement of a web of filter material between filter plates having rim regions which, with the filter material, form filter chambers.

BACKGROUND

U.S. Pat. No. 3,608,734, Schneider, the disclosure of which is hereby incorporated by reference, as well as Schneider's subsequent published European Patent Application 0 032 829, describe plate filters in which a stack of filter plates with surrounding rims have a filter web material located therebetween. Two, each, of the filter plates are separated by the filter material to form, at one side of the filter material, an inlet chamber and, on the other side of the filter material, an outlet chamber for a fluid to be filtered, upon passing through the filter material. Typically, the fluid is a liquid which is guided to the inlet chamber, beneath the lower surface of an upper plate, then passing through the filter material and into the outlet chamber formed by the upper surface of the next lower filter plate. All the inlet chambers as well as the outlet chambers are coupled to respectively common inlets and outlets, for example inlet and outlet manifolds.

The filter material is supplied in form of a web, and can be easily replaced by moving the filter material through the filter chamber. This is done by a periodically operating transport arrangement in which a portion of filter material, which has become used and requires replacement, is rolled away from the respective filter chamber and a new portion of filter material is introduced.

To permit ready movement of the filter material, it is supplied in web form, for example from rolls, similar to paper webs or the like. The plates of the stack of filter plates are first separated from each other by an apparatus which, additionally, after separation and after movement of the web of filter material, presses the plates against each other, with the filter material web interposed. The edges of rims of the respective plates forming the inlet and outlet chambers pinch or clamp the filter web material therebetween. This clamping of the filter material web provided for sealing of the inlet and outlet chambers from each other. A circumferential groove adjacent the edge of the plate is provided to collect any leakage fluid, which then can be removed by a suitable pump.

Plate filters of this type can be uesd with additional auxiliary materials, for example siliceous earth, or other types of diatomaceous earth. Use of auxiliary filter material, for example siliceous earth, causes formation of a filter cake in the inlet chamber. Usually, the filter web material is located horizontally between the respective plates. The filter cake on top of the web is removed, periodically, together with the portion of the filter web from the plate filter upon separation of the filter plates; a transport apparatus then transports the web material together with the accumulated filter cake out from the then separated filter chambers.

The referenced U.S. Pat. No. 3,608,734 describes a filter web transport arrangement including a gripping arrangement for the web material having pointed pins which penetrate within the filter web material to transport it through the filter structure, when the plates are separated. The pointed or prickly pins damage the filter web so that it can be used only once. The European Patent Application 0 032 829 describes a transport arrangement for filter web material having a transport roller and a clamping or pinch or counter roller. The counter roller has a plurality of disks associated therewith which can penetrate within the filter cake and are provided to press the filter web against the transport roller to ensure that the filter web will be reliably carried along with the transport roller.

The used filter web, together with the filter cake, can be transported to a reception container.

It may occur that, upon transporting filter material webs through the plate filter, the webs will skew with respect to the edges of the filter plates. Transporting any moving web, unsupported, over a substantial distance is difficult, and it is difficult to avoid skewing of the web.

If the filter material web is skewed with respect to the edges of the filter plates, the filter web may not be securely clamped throughout the circumference of the filter plates when they are pressed against each other, so that liquid to be filtered can escape, running out of the plates and to the floor surface on which the filter structure is placed. Thus, replacement of a section of filter web either requires continuous operator supervision to permit correction of any possible skewing of the web and to effect immediate correction; or automatic sensing and control apparatus must be provided which sense the running direction and any deviation from a predetermined path of the filter web, and reposition the filter web. Such apparatus is complex and expensive and requires continuous maintenance for proper operation.

The plate filters as described remove any filtrate or filter cake together with the filter web; the filter cake is not separated from the web after a section of filter web is replaced within the filter structure. This makes it very difficult to re-use the filter material web as well as to clean, recycle and reuse the siliceous earth; subsequent later separation of siliceous earth from filter material is difficult if not impossible.

THE INVENTION

It is an object to provide a method and apparatus in which, automatically, a web is guided in a predetermined path while preventing skewing of the web with respect to the predetermined path, and more particularly to guide a web of filter material through a plate filter while preventing mismatch of the filter material with respect to the plates; and especially to prevent leakage of liquid to be filtered from a stacked plate filter array; it is also desirable to so arrange the structure and method that the filter material web, as well as any auxiliary filtering material such as siliceous earth, can be separated for subsequent re-use or recycling.

Briefly, skewing of the moving web, typically a filter web, is avoided by drawing or pulling the web about a deflection edge which is located at an angle of inclination with respect to the feed path in advance of the deflection edge. The web will thus define, with respect to the deflection edge, a run-on portion which is located in advance of the deflection edge, and a run-off portion which is located after the deflection edge. The web portions define two angles. The angle $\alpha$, called deflection angle, is the angle between the center line or direction of the correct feed path of the run-on portion and the center line or direction of the correct feed path of the run-off portion. The angle $\beta$, called diversion angle, is the angle between the two planes which are defined by the run-on portion and the run-off portion. To prevent skewing, in accordance with the invention, the deflection angle $\alpha$ is held larger than the diversion angle $\beta$.

The deflection edge may be formed by a deflection element, such as a bar or plate, having an edge with a small radius, preferably 2–6 mm.

The apparatus to carry out the method can use the apparatus described, for example, in the referenced U.S. Pat. No. 3,608,734, modified only in accordance with the present invention, by additionally providing a deflection element which defines a deflection line, the deflection element being positioned in the path of the filter web, and forming an angle $\gamma$, preferably 45° with respect to the feed path in advance of the deflection element.

The method and structure or system in accordance with the present invention has the advantage that any forces which arise upon possible skewing of the web, as it is transported through the filter, will automatically tend to return the web to the correct feed path.

If the wrap angle of the web about the deflection edge is 180°, the web diversion angle between run-on and run-off surfaces of the sheets will be 0°. This is a preferred arrangement so that, then, the web before deflection by the deflection edge and the web after deflection will be parallel to each other. In such an arrangement, the surfaces of the webs are completely turned about so that the upper surface of a horizontal web then, after deflection, will form the lower surface. When used in plate filters, this has a specific advantage, namely it is then readily possible to clean the web of filter material coming from a first stack of plates and then pass the same web to a second stack of plates with the unused filter surface being directed upwardly, where it is useful for a second filter operation.

The angle of deflection of the web is preferably 90°, which, in actual operation, means that the deflection edge is located at 45° with respect to the feed path. Using a deflection angle of 90° and a web plane diversion angle of 0°, permits a particularly suitable arrangement of filter arrays in which different units of arrays are located at an angle of 90° with respect to each other.

In accordance with a feature of the invention, the filter web material is supplied between plates of stacked filter plates which can be selectively separated or pressed against each other. A filter web transport arrangement for the respective filter webs is provided, engageable with the filter web, to respectively replace a web section from between the plates with a fresh web section upon separation of the plates. For filtration, the plates are pressed together. The deflection edge provides for automatic self-regulating of the path of the filter web between the plates. This, then, automatically and without further supervision, avoids the danger that, upon compression of the filter plates against each other, the web material is not located about its entire circumference by the sealing arrangements on the filter plates themselves—which can be, for example, as described in the referenced U.S. Pat. No. 3,608,734, thereby avoiding the possibility of escape of liquid from between the filter plates. Expensive monitoring and control apparatus to supervise a plurality of filter webs, passing between vertically stacked filter plates, is thus not necessary.

Placing the deflection element defining the deflection edge so that the deflection angle of the web will be 90°, simplifies the construction of plate filters since, then, the transport apparatus can extend at a right angle with respect to the stacked filter plates and the overall system becomes compact.

The web plane diversion angle is, preferably, 0°. The web thus is looped over the edge to form a wrap angle of 180° so that, after deflection, the planes of the run-on and run-off webs will be parallel. This arrangement permits guidance of a plurality of filter webs parallel to each other, even after deflection, so that a substantial number of parallel webs can be used with a filter plate array without introducing space problems.

Deflection of the filter webs can be towards either the right or left side, with respect to the original transport direction of the web. Accordingly, if a plate filter with horizontal plates is looked at from above, deflecting the filters webs towards the right or to the left permits locating another filter plate array at the right or at the left side, respectively, or, upon deflection of alternate filter webs to the right and to the left, locating two stacks of filters plates behind a first stack of filter plates, each one of the additional filter stacks being located respectively to the right and the left of the first filter plate stack.

In accordance with a feature of the invention, the deflection edges or elements are located vertically above each other since this permits a simple construction with the advantage that the filter cakes, if present, will separate from all filter webs at the same position and no complicated separating arrangements are necessary in order to guide the separated filter cakes into a suitable reception container. Separation of the filter cakes from the webs and peeling them off the webs is particularly simple if the deflection edges are formed as elements or bars having an edge of a relatively small radius, for example of from between about 2 mm to 6 mm.

The path of the filter web can be as desired, and, for example, can be directed over a second deflection edge, located for example parallel with respect to the first deflection edge so that the web will be guided in the same direction as the initial direction of movement, for example after being spooled off a supply reel or roll. Locating the second group of deflection edges at an angle of 90° with respect to the first one permits directing the web such that it will move counter to the direction of the original direction of movement.

Preferably, the filter web transport arrangement includes a transport roller and a counter or pressure roller engaged against the transport roller, with a filter web therebetween. Due to the deflection edge, and possibly by using an additional cleaning arrangement, any filter cake can be completely removed from the web so that a simple web transport arrangement formed by a transport roller and a pressure roller can be used for transporting and feeding the filter web without difficulties or complex apparatus.

The transport roller, preferably, is coated with rubber, plastic or other material increasing friction with respect to the filter web material. The transport roller can be driven by a chain, for example a sprocket chain or the like, which, if flexible, permits a separation movement of the filter web transport rollers in synchronism with opening and closing of the filter plates of the plate stack with respect to each other. When the plates are moved away from each other, to permit movement of the filter plates, the chains are stretched and then can be driven to transport the filter web, for example by a drive motor. Moving the transport rollers vertically away from each other and towards each other in synchronism with the filter plates has the advantage that the filter webs will not form loose loops between the stack of plates and the transport arrangement and increase the use of filter web material. However, if cheap filter web material may be used such increased use may be tolerated, thus obviating the need for a design permitting a change of the distance between the transport rollers.

The transport arrangement is preferably located downstream, with respect to movement of the filter web, behind the deflection edge or rod; if a plurality of deflection edges are used, the filter web transport arrangement is located downstream from the last group of deflection edges. A single filter band transport arrangement for each one of the webs is suitable.

A cleaning and cake stripping apparatus is preferably associated with the respective deflection edges. A rotating brush, or a tensioned wire extending close to the filter web surface, to clean the filter web is suitable. Such a cleaning arrangement is of particular utility if the filter web is to be re-used after having been cleaned. In accordance with a feature of the invention, two stacks of plates can be located, sequentially behind each other with respect to transport of the filter web, by interposing therebetween a deflection edge together with the cleaning apparatus; this permits use of the filter web twice before it is spooled or rolled on a 'used web' roll.

Used filter web material is finally discharged to a receptacle or spooled or rolled on rolls. In accordance with a feature of the invention, the used-web rolls are associated in groups, each group receiving a plurality of webs after having been used, and each web being individually rolled on a separated 'used-web' roll. This arrangement permits supply rolls and take-up rolls to be of the same size.

If the used web rolls are located vertically above or below each other, a different diametrical arrangement may be needed. Preferably, the various groups of adjacently located used-web rolls are located above each other, which has the advantage of efficient utilization of available space. It is also possible to use a single used-web roll which receives all used filter webs after having been passed through the filter stack, or to use a plurality of receiving rolls, each of which accept a plurality of filter webs as well. For instance, each take up roll may handle 2 or more webs.

DRAWINGS, ILLUSTRATING EMBODIMENTS OF THE INVENTION

DETAILED DESCRIPTION.

Figure 1:
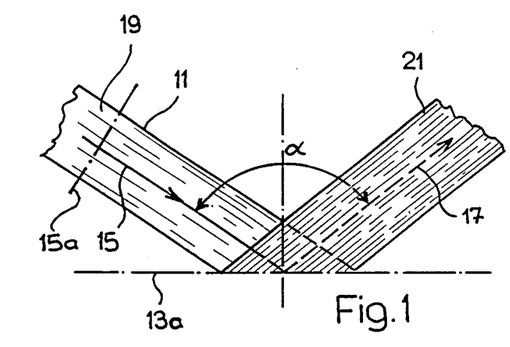
FIG. 1 is a schematic illustration showing the deflection angle of a tape or web being deflected about a deflection edge.
Figure 2:
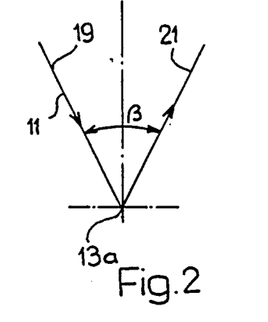
FIG. 2 is a side view of the tape or web shown in FIG. 1 being deflected about a deflection edge.

FIGS. 1 and 2, should be considered together to see the spatial relationship of the lines 13a, 15 and 17 and of the angles $\alpha$ and $\beta$. Highly schematically, they show deflection of a web, tape or ribbon 11 about a deflection line or edge 13a. For purposes of explanation, the edge 13a is here considered as a theoretical line. The run-on direction of the tape or web 11, shown by the center line 15, is inclined with respect to the run-off direction 17 by an angle $\alpha$, called web deflection angle. In accordance with a feature of the invention, this web deflection angle $\alpha$ is larger than the angle $\beta$, FIG. 2, included between the plane 19 of the web before deflection and the plane 21 of the web after deflection. Angle $\beta$ is called diversion angle. If the angles $\alpha$ and $\beta$ were the same, the deflection edge 13 would be perpendicular to the run-on direction and to the run-off direction as shown by lines 15 and 17. This, in accordance with a feature of the invention, is deliberately avoided.

Let it be considered that the deflection line 13a, FIG. 1, is fixed in space, and that the web 11 is shifted towards the right, for example due to a skewing of the path of the web so that it will no longer follow the theoretical line 15 throughout its width. It can be clearly seen that the left edge of the web 11 then will no longer engage the deflection line 13. This effect, however, is automatically prevented if the web 11 is placed under tension since the resulting forces have the tendency to return the web 11 into the position in which it is, normally, in contact with the deflection line 13a over its entire width.

This effect is used in accordance with the present invention to automatically control the position of the web as it runs between the filter plates of the stacked filter apparatus.

Figure 3:
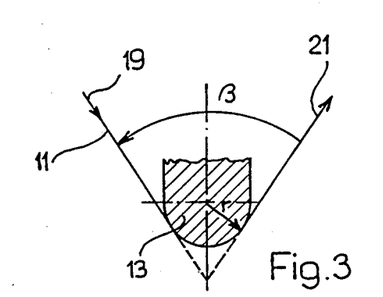
FIG. 3 is a side view, to an enlarged scale, of a deflection edge in form of a bar or plate with a rounded deflection corner.
Figure 4:
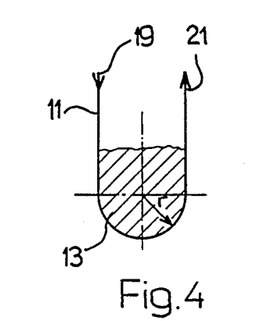
FIG. 4 is a side view similar to FIG. 3, in which the planes of the run-on and run-off webs are parallel.

In actual practice, the deflection line 13a cannot be a theoretical, mathematical line but, rather, forms a deflection edge or deflection surface. Preferably, it is the rounded edge or surface of a rod plate, or the like, as shown in FIG. 3. The radius r should be small, for example between 2 to 10 mm, preferably 5 to 6 mm. In most cases, it is preferred to so guide the web that the run-on surfaces 19 and the run-off surfaces 21 are parallel with respect to each other. If the edge were a theoretical line 13a (FIG. 2), the angle $\beta$ then will be 0°. The angle $\alpha$ should have a certain value, however, to permit the desired effect of automatic, self-regulating control of the path of the web to take place. A web deflection angle $\alpha$ of 90° is particularly suitable because it leads to substantial advantages in placement of apparatus. The angle is not critical, however, and experiments have shown that if the web plane diversion angle $\beta$ is 0°, so that the planes 19, 21, in an actual construction, are parallel, web deflection angles $\alpha$ of between 70° to 110° are suitable.

Since the angles are not critical, some deviations from numerical values are quite possible for example due to loose or wide tolerances, which, in the description herein, is at times indicated by the term 'about'. Thus, the respective angles may vary a few degrees, plus or minus, within manufacturing tolerances or stretch tolerances of the equipment and the materials, for example the web being used.

Figure 5:
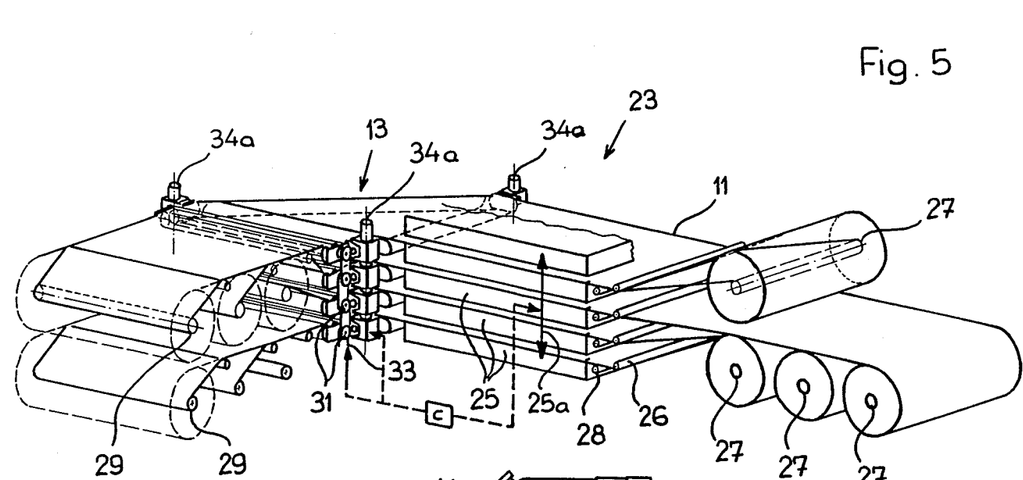
FIG. 5 is a partly schematic perspective view of a plate filter and illustrating deflection of filter webs in accordance with the present invention.

The plate filter, see FIG. 5, can be in accordance with a suitable and known construction, for example as illustrated in the referenced U.S. Pat. No. 3,608,734, Schneider. FIG. 5 illustrates the plate filter only schematically, in association with the structure of the present invention.

A plurality of vertically stacked filter plates 25, for example 20 or so, form a vertical filter stack 23. The plates 25 can be clamped against each other with the filter web 11 between adjacent plates, or separated from each other as schematically shown by arrow 25a. Since the separation structure, as such, is known, and can be in accordance with any suitable construction or as illustrated in the referenced U.S. Pat. No. 3,608,734, the mechanism has been omitted from the drawings for simplicity. The plates 25 are preferably horizontally placed. The specific construction of the plate stack 23 is described in the referenced U.S. Pat. No. 3,608,734.

Figure 6:
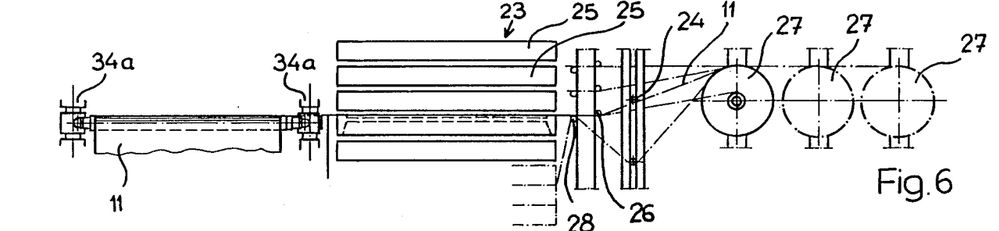
FIG. 6 is a side view of the filter of FIG. 5.

A plurality of filter material webs 11 are spooled off supply rolls 27. The webs are suitably tensioned by a tensioning apparatus 24 (FIGS. 6, 7), as well known, and guided via guide rollers 26, 28 between two adjacent or neighboring plates 25.

In accordance with the invention, the deflection edge 13 is arranged at an angle $\gamma$ of 45° (FIG. 10) with respect to the original direction of web supply. This changes the direction of movement, or direction of the web, by 90° and, further, reverses the top and bottom sides of the web 11. The various webs 11 are then wound up on wind-up rolls 29.

A web transport apparatus 31 is provided for each one of the webs, the web transport arrangement 31 being driven by chains 33 from a common drive motor—not shown—and as well known. A lifting mechanism 34 is coupled to the plates to move the plates in accordance with the arrow 25a, to separate the plates 25 from each other or compress them. Reference is made to U.S. Pat. No. 3,608,734. Each one of the web transport arrangements 31 includes a transport roller 35 (FIG. 8), preferably having a rubber or other high-friction surface, and an engagement or counter and pressure roller 37. The web transport apparatus 35 is located physically behind the deflection edge or rod 13, and subsequently located take-up rolls 29 receive the used-filter web. The respective rollers 35 and 37 are retained in suitable support posts 34a, which can also retain the deflection edges 13 in position (see FIG. 8). They can move with mechanism 34.

Figure 7:
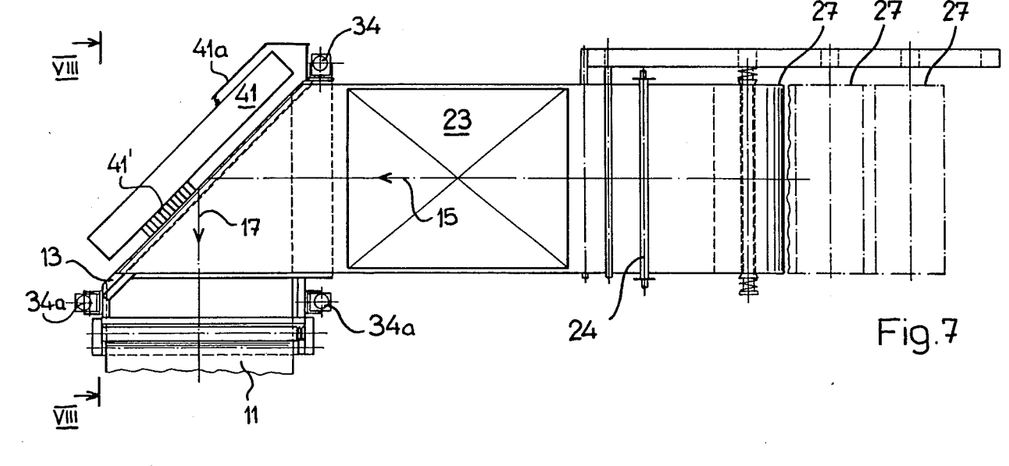
FIG. 7 is a top view of the filter of FIG. 5.

In accordance with a feature of the invention, the deflection edges 13 for all the filter webs 11 can be located above each other, as shown in FIG. 7. A receptacle 41a, shown only in fragmentary form, is provided to receive filter cake or filter cake material, separated from the webs 11. A brush, for example a rotating brush 41 having bristles 41', and located parallel to the deflection edge 13 (FIG. 7) separates filter cake material from the surface of the web 11, and cleans web 11 of accumulated filtrate. The deflection edges 13 cleanly separate any filter cake or press cake from the underlying filter web 11. This substantially improves the wind-up of used filter web 11 on the wind-up rolls 29.

Figure 8:
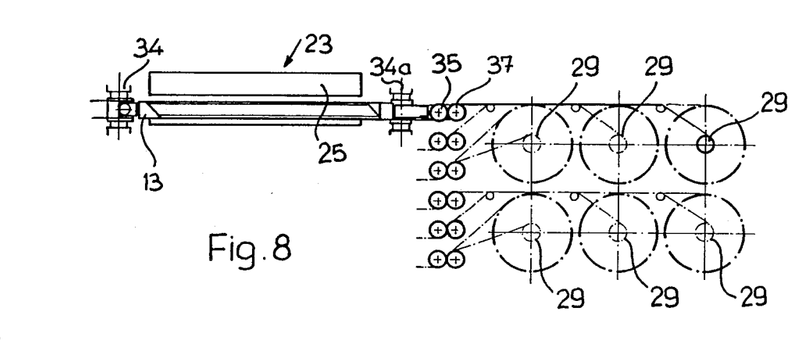
FIG. 8 is a sectional view along line VIII—VIII of FIG. 7.
Figure 9:
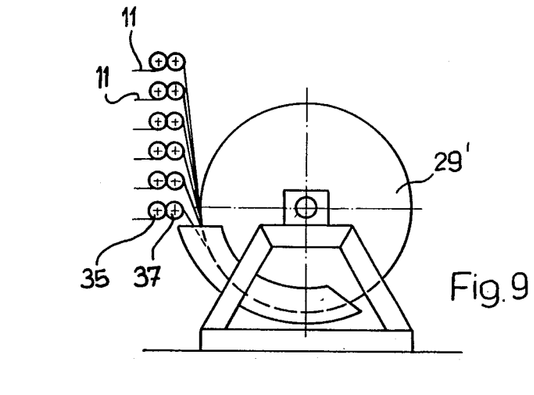
FIG. 9 is a schematic showing of a common used-web reception reel for a plurality of webs.

In accordance with a feature of the invention, a plurality of wind-up rolls 29 are combined in horizontal groups, with the groups located, respectively, above each other, see FIGS. 5 and 8. For example, if three wind-up rolls 29 are located next to each other (see FIG. 8), it is possible to so arrange the respective wind-up rolls that, with the web wound thereon, each roll may have three times the diameter than when the wind-up rolls would be located in a line above each other. The arrangement of the wind-up rolls, in groups, permits dimensioning of the respective rolls 29 which is sufficient to accept the entire filter web which is rolled off the filter supply rolls 27; any one of the rolls 29 can accept the material from any one of the supply rolls 27. Alternatively, however, one or more filter webs can be wound on a common wind-up roll 29', see FIG. 9.

Figure 10:
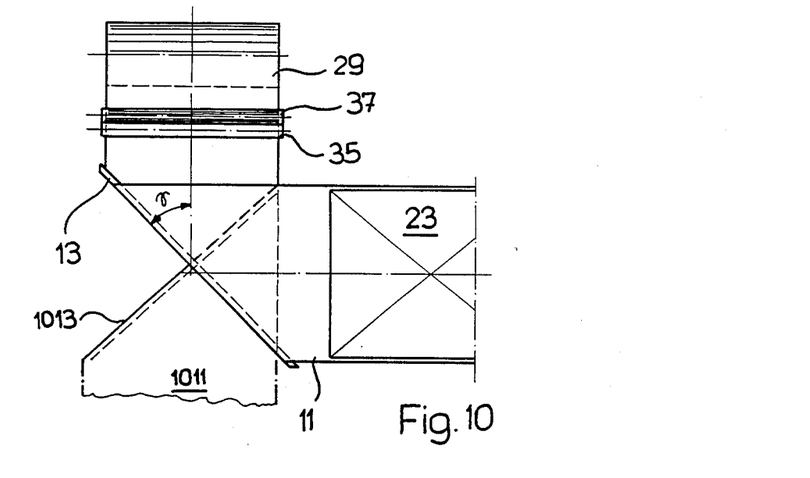
FIG. 10 is a fragmentary view of the web and a deflection arrangement therefor, in which deflection of the web is towards the right, and/or alternatively towards the left.

FIG. 7 is a top view of a filter arrangement in which the web 11 is deflected towards the left. FIG. 10 illustrates, in fragmentary schematic representation, an arrangement in which a top layer or top web 11 is deflected towards the right, and for another filter web, for example one below the top web 11, a second deflection edge or rod 1013 is located, deflecting another web 1011 towards the left. FIG. 10, thus, shows that the web can be deflected in either direction or selected webs can be deflected alternately, or as selected, towards the right and towards the left.

Figure 11:
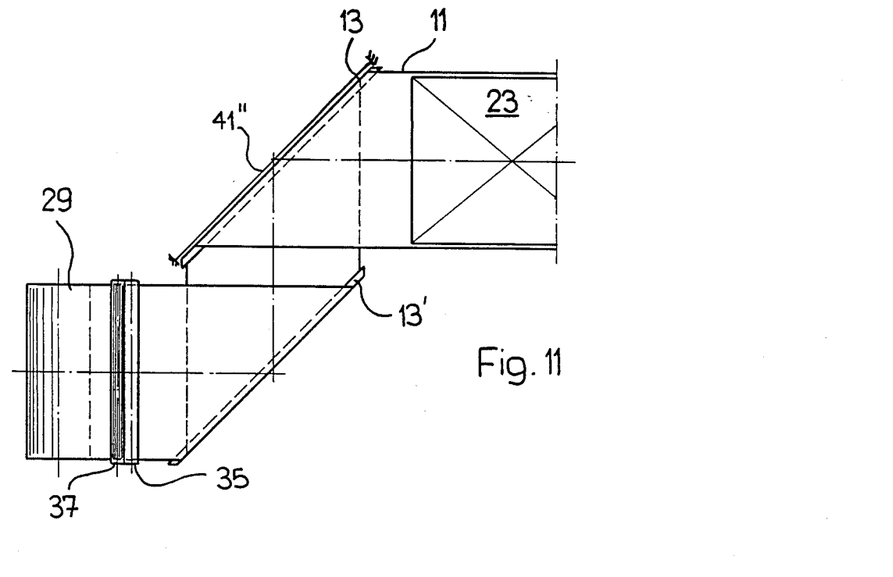
FIG. 11 is a schematic top view, illustrating the deflection path of a web with two deflection edges.
Figure 13:
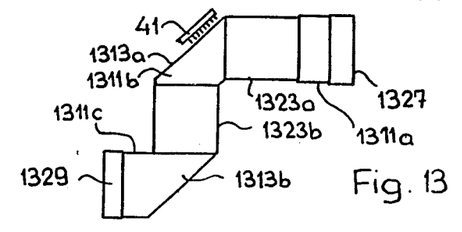
FIG. 13 is a schematic top view of a filtration system using a plurality of filter stacks, sequentially positioned in the path of the filter web.

FIG. 11 is a top view of another arrangement in which two parallel deflection edges or rods 13, 13' deflect a web 11 twice before it is transported by the transport roller 35 and the associated pinch roller 37 to a wind-up roll 29. To facilitate separation of filter cake from the web 11, a tensioned wire 41" extends substantially parallel to the deflection edge 13. FIG. 13 illustrates an arrangement similar to FIG. 11 in which, however, a supply roll 1327 supplies a web 1311a to a first stack of plates 1323a. The web is then deflected from a first deflection edge 1313a, cleaned by a cleaning brush 41, to pass through a second filter stack 1323b. The web passing through the filter stack 1323b will be reversed with respect to the web supplied from supply rool 1327, and the reverse web is schematically indicated at 1311b. After filtering additional fluids in the filter stack 1323b, now with the previously used top surface on the bottom, the web is deflected once more by a deflection edge 1313b to have the original surface orientation as shown at 1311c, to be wound up on a wind-up roll 1329.

Figure 12:
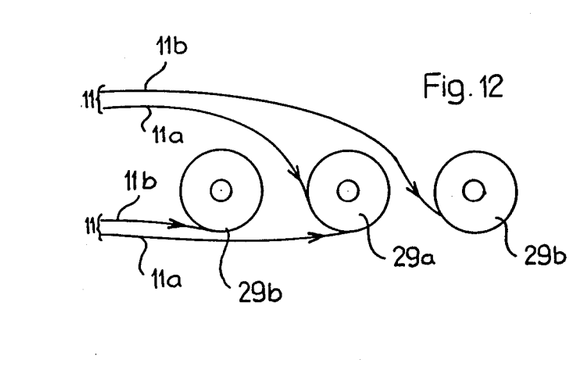
FIG. 12 is a highly schematic side view of a deflection arrangement for separately winding layers of a two-layer filter web.

A plurality of web layers may be combined to form a web assembly which, for simplicity, in the foregoing description was referred to merely as a 'web'. For example, a web formed of web elements 11a, 11b, see FIG. 12, can be used; one of the web elements, for example the element 11b, may form a transport web or transport belt, and another layer or element then can form the actual filter medium 11a. The transport element 11b may be constructed to have high tensile strength so that the web element 11a may be a relatively cheap material having low tensile strength, to be supported by the web element 11b. FIG. 12 shows the web elements 11a, 11b separated from each other for clarity. The actual filter medium element 11a can then be directed, together with any filter or press cake, into a reception structure, whereas the transport belt or web 11b is wound on a wind-up roll 29 or, as shown in FIG. 12, on wind-up rolls 29b. A separate wind-up roll for one or more actual filter webs 11a can be provided, as shown by roll 29a, the belts or elements 11b, for example in form of ribbons or belts located, for example, along the edges of the web 11a, being reeled up separately for re-use.

Various changes and modifications may be made, and any features described herein may be used or combined with any of the others, within the scope of the invention concept.

For example, the elements 34a retaining the transport mechanism 31 can also be used to hold in position and align the deflection rods 13 with the web 11 as it is being passed between the plates, when the plates are separated. The elements 34a, thus, can all move vertically, in synchronism with separation of the plates 25, as schematically shown by the double arrow 25a. If desired, the run-on guide rollers 26, 28, likewise, can be positioned in accordance with the positioning of the plates 25, by synchronous movement, up and down, of the guide rollers upon separation or compression of the plates 25 of the filter plate stack 23.

To sum it up, a web, for instance, a filter web of cloth or paper (11) is drawn over a diversion edge (13) placed at 45 degrees to the direction of web transport so that the lower surface of the web will then be turned completely upwards. The diversion edge (13) prevents a skew running of the web because if this happens forces arise in the web to bring it immediately back to the original position wherein its full width rests in even contact with the edge (13). The diversion edge (13) is very suitable for efficient separation and collection of used filter cake from its septum being a web of flexible cloth or paper. The diversion edge also permits rewinding of webs to a large diameter otherwise not feasible. Either individual or collective rewinding of webs such as filter webs is practical and moreover such edges (13) provide extremely good flexibility to change direction of web transport and to adapt machine processes without need of expensive edge monitoring and regulating devices.

I claim:
1. A method of regulating the running of a moving web of filter material (11, 11a, 11b, 1011, 1311a, 1311b, 1311c) between spaced filter plates having side edges, while preventing skewing of the filter medium web with respect to said edges, comprising the steps of
drawing or pulling the web about a deflection edge (13, 1013, 13', 1313a, 1313b) located at an angle ($\gamma$) with respect to a moving direction of the web, said web thereby defining, with respect to said deflection edge, a run-on surface (19) in advance of the deflection edge and the run-off surface (21) behind the deflection edge,
said run-on surface and said run-off surface defining a web deflection angle ($\alpha$) between the moving direction of the web in advance of the deflection edge and the moving direction of the web after or downstream of the deflection edge,
and further defining a web plane diversion angle ($\beta$) between said run-on surface and said run-off surface; and
wherein the deflection angle ($\alpha$) is larger than the web plane diversion angle ($\beta$).

2. The method of claim 1, wherein said deflection edge (13) is located at an angle of 45° with respect to a side edge of said filter plates extending transversely to the moving direction of the web; and
wherein said run-on and run-off surfaces are essentially parallel.

3. The method of claim 11, wherein two stacks of spaced filter plates are provided, and said method includes the step of passing said web first between a first stack of filter plates, whereby, in operation, a first surface of the web has filter cake material deposited thereon; then
passing the web over a first deflection edge (13), thereby reversing the surfacer orientation of the web with respect to said plates, and passing the web with the reversed surface orientation through the second stack of filter plates; and
upon passing the web about said first deflection edge, cleaning the surface of the filter medium and, at least in part, removing filter cake material accumulated on the first surface being passed about the deflection edge from said first surface.

4. The method of claim 1, wherein the step of drawing or pulling the web comprises passing said web over a first deflection edge (13), thereby reversing the surface orientation of the web, and then passing the web with the reversed surface orientation about a second deflection edge; and exerting a pulling force on the web behind or downstream of the second deflection edge.

5. Plate filter having a stack (23) of essentially parallel plates, positionable, respectively, separable and compressible in relation to each other;
a web of filter material (11) positionable between neighboring filter plates;
means (27, 26, 28) for supplying the web of filter material and for guiding said web along a path between the plates, thereby placing selective portions of the web of filter material between the plates;
transport means (35, 37) engageable with the web of filter material for transporting the web through the stack of plates when the plates are separated from each other, and for removing used filter material from between the plates; and
means (25a) for separating the plates from each other to permit movement of the filter material, and then for compressing the filter plates towards each other, with the filter material therebetween, to permit filtration,
and comprising:
means (13) for ensuring feed of the filter material in a predetermined orientation with respect to the filter plates positioned between the web supply means (27, 26, 28) and said transport means (35, 37),
said feed orientation means including
a deflection means (13) defining a deflection line positioned in the path of the web and located at an angle with respect to said predetermined orientation, said web being passed about the deflection means and defining a run-on surface (19) in advance of the deflection means and a run-off surface (21) behind the deflection means (13), and forming a web deflection angle (α) between the direction of feed before the deflection means (13) and the direction of feed after the deflection means (13), and further defining a diversion angle (β) between said run-on and run-off surfaces, said web deflection angle (α) being greater than said diversion angle (β).

6. Plate filter according to claim 5, wherein said web deflection angle (α) is 90°.

7. Plate filter according to claim 6, wherein said diversion angle (β) is 0°.

8. Plate filter according to claim 6, further including a web cleaning device (41) located at or downstream of the deflection means (13) and engageable with a filtration surface of said web of filter material for cleaning said filtration surface.

9. Plate filter according to claim 8, wherein said cleaning device (41) comprises a rotating brush.

10. Plate filter according to claim 8, wherein said cleaning device (41) comprises a wire located a predetermined distance from the deflection edge.

11. Plate filter according to claim 5, wherein said web deflection angle (α) is 90° and said diversion angle (β) is 0°.

12. Plate filter according to claim 5, wherein a plurality of webs of filter material are provided, one each being passed between a pair of adjacent filter plates;

and wherein a plurality of deflection means for deflection of the webs (11) are provided, said plurality of deflection means being located vertically above each other.

13. Plate filter according to claim 12, wherein selected ones of said deflection means are located such that the angles with respect to said predetermined orientation, respectively, deflect the web of filter material in respectively opposite directions.

14. Plate filter according to claim 5, wherein the deflection means comprises an element having a deflection edge of a radius in the order of between about 4 mm to 10 mm.

15. Plate filter according to claim 5, wherein the deflection means comprises at least two deflection elements (13, 13''; 1313a, 1313b) located sequentially in the path of transport of said web of filter material.

16. Plate filter according to claim 5, wherein said transport means (31) comprises a transport roller (35) engageable with one side of said web and a counter or pressure roller engageable with the opposite side of said web.

17. Plate filter according to claim 16, wherein at least one of said rollers has an elastic high-friction surface.

18. Plate filter according to claim 16, further including a chain drive (33) coupled to and for rotating at least one of said rollers.

19. Plate filter, according to claim 18, further including a plurality of individual webs and synchronization control means (C) spacing the transport means for the individual webs in synchronism with operation of said separating means.

20. Plate filter according to claim 5, further including synchronization control means (C) spacing said transport means in synchronism with operation of said separating means (25a).

21. Plate filter according to claim 5, wherein said transport means (31, 35, 37) is located downstream, with respect to transport movement of said web, of said deflection means (13, 13'; 1313a, 1313b).

22. Plate filter according to claim 5, wherein a plurality of webs are provided and further including web take-up means including at least one take-up roll;

wherein said take-up means includes a plurality of take-up rolls (29) located in groups, each group of take-up rolls having a plurality of webs (11) wound thereon, one web (11) being wound on a respective roll.

23. Plate filter according to claim 22, wherein the rolls of the respective groups are located horizontally adjacent each other, and a plurality of groups of rolls are located above each other.

24. Plate filter according to claim 22, wherein said take-up means comprise a common take-up roll (29'), and a plurality of webs (11) are passed between said plates (25) and rolled on said common roll.

25. Plate filter according to claim 22, wherein the rolls of the respective groups are located axially adjacent each other.

26. Plate filter according to claim 22, wherein the rolls of the respective groups are located horizontally adjacent each other.

27. Plate filter according to claim 5, wherein (FIG. 13) a plurality of stacks of plates (1323a, 1323b) are provided;

and said web (1311a, 1311b, 1311c) is passed through a first one (1323a) of said stacks of plates, then over a deflection element (1313a) of said deflection means, then through a further one (1323b) of said stacks of plates, and then over a further deflection element (1313b) of said deflection means.

28. Plate filter according to claim 5, wherein (FIG. 12) said web of filter material comprises a plurality of layers (11a, 11b);

and take-up roll means (29a, 29b) are provided for, respectively, rolling up respective layers of the filter material after having passed through said stack (23) of plates.

29. Plate filter according to claim 28, wherein a plurality of multi-layer webs are provided, and at least one of said take-up roll means has at least one layer of said plurality of multi-layer webs rolled thereon, and another one of said roll means has at least one other layer of said multi-layer webs rolled thereon.

* * * * *